United States Patent [19]
Tamada et al.

[11] Patent Number: 4,788,595
[45] Date of Patent: Nov. 29, 1988

[54] IMAGE SENSOR DRIVING CIRCUIT

[75] Inventors: Masayuki Tamada, Miyagi; Junichi Takahashi, Yokohama, both of Japan

[73] Assignees: Ricoh Company, Ltd., Tokyo; Tohoku Ricoh Co., Ltd., Miyagi, both of Japan

[21] Appl. No.: 120,541

[22] Filed: Nov. 13, 1987

[30] Foreign Application Priority Data

Nov. 17, 1986 [JP] Japan .................. 61-273516

[51] Int. Cl.[4] .............................. H09N 3/14
[52] U.S. Cl. .................... 358/213.31; 358/213.11; 358/213.15
[58] Field of Search ............... 358/213.22, 213.15, 358/213.31, 213.11; 357/24 LR

[56] References Cited

U.S. PATENT DOCUMENTS

| | | | |
|---|---|---|---|
| 4,495,523 | 1/1985 | Ozawa | 358/213.15 |
| 4,514,765 | 4/1985 | Miyata et al. | 358/213.22 |
| 4,543,610 | 9/1985 | Ozawa et al. | 358/213.28 |
| 4,549,088 | 10/1985 | Ozawa | 358/213.31 |

OTHER PUBLICATIONS

S. Bornonkay et al., "Analyse de Documents pour la Telecopie", Acta Electronica, 21, 1, 1978, pp. 55-70.

Primary Examiner—Jin F. Ng
Assistant Examiner—Stephen Brinich
Attorney, Agent, or Firm—Oblon, Fisher, Spivak, McClelland & Maier

[57] ABSTRACT

An image sensor driving circuit for driving an image sensor by applying a voltage thereto comprises a voltage supplying circuit for supplying a positive or negative polarity voltage to the image sensor responsive to a control signal, a converting circuit for converting an output photocurrent of the image sensor into a detection voltage, an inverting circuit for inverting the detection voltage responsive to the control signal, and a control circuit for generating the control signal. The control signal has a predetermined period so that the voltage supplying circuit alternately supplies the positive and negative polarity voltages with the predetermined period and the inverting circuit inverts the detection voltage only during one of first and second halves of each period of the control signal.

6 Claims, 4 Drawing Sheets

IMAGE SENSOR DRIVING CIRCUIT

BACKGROUND OF THE INVENTION

The present invention generally relates to image sensor driving circuits, and more particularly to an image sensor driving circuit for use in a facsimile machine and the like which employ coplanar photoelectric conversion elements.

Generally, an apparatus for reading a document (image) by use of a coplanar image sensor comprises a plurality of photodetector elements arranged in a line. The photodetector elements are divided into photodetector element groups, and each photodetector element group is connected to a common first electrode. On the other hand, corresponding ones of the photodetector elements from each photodetector element group are connected to an individual second electrode through a matrix multilevel inter-connection.

FIG. 1 shows an example of the conventional image sensor driving circuit. The image sensor driving circuit comprises a control logic circuit 1, an image sensor 2 comprising a plurality of photodetector elements, a voltage applying circuit 3, and a current-to-voltage converting circuit 4. A voltage for reading information from the document (image) is sequentially applied to the image sensor 2 from the voltage applying circuit 3 under the control of the control logic circuit 1. The photodetector elements of the image sensor 2 receive a quantity of light dependent on the information optically read from the document, and supply photocurrents to the individual electrodes when applied with the voltage from the voltage applying circuit 3. The current-to-voltage converting circuit 4 sequentially converts the photocurrents into a detection voltage indicative of the read information.

FIG. 2 shows a cross sectional view of the photodetector element. The photodetector element generally comprises a substrate 10, a semiconductor layer 11 made of an optical semiconductor such as amorphous silicon having photoelectric conversion effect and made to a predetermined size by an etching, for example, metal electrodes 12 and 13 for obtaining a photocurrent, and highly doped portions 14 and 15 for making ohmic contact between the respective metal electrodes 12 and 13 and the semiconductor layer 11. For example, the metal electrode 12 is connected to the common first electrode described before, and the metal electrode 13 is connected to the individual second electrode.

In the conventional image sensor driving circuit, the voltage applied to the photodetector elements of the image sensor 2 from the voltage applying circuit 3 has a fixed polarity such as +12 V. But according to experiments conducted by the present inventors, a dark current Id from the photodetector element increases substantially with the voltage applying time when the voltage having the fixed polarity is applied to the photodetector element. In FIG. 3, a characteristic I shows a voltage applying time versus dark current characteristic obtained in the conventional image sensor driving circuit. Due to the large increase in the dark current Id with the voltage applying time, a light/dark ratio Il/Id between a photocurrent from the photodetector element which receives light and the dark current Id from the photodetector element which receives no light greatly decreases with the voltage applying time as indicated by a characteristic II in FIG. 4. Hence, in the conventional image sensor driving circuit, there is a problem in that the light/dark ratio Il/Id which influences the reading accuracy greatly deteriorates with the voltage applying time.

It is thought that the reason for the increase in the dark current Id occurring when the voltage having the fixed polarity is continuously applied to the photodetector element is due to the fact that some kind of positive (or negative) charge is induced at an interface between the metal electrode 12 (or 13) and the highly doped portion 14 (or 15), or at an interface between the highly doped portion 14 (or 15) and the semiconductor layer 11. It is thought that the induced charge is trapped at the interface, and a channel through which a current flows is formed between the two metal electrodes 12 and 13.

After the dark current Id increases, the dark current Id will not decrease at once to the original state in which the dark current Id is small even when the voltage is no longer applied to the photodetector element. From a time when the application of the voltage to the photodetector element is stopped, it takes time in order of several tens of hours for the dark current Id to decrease to the original state. In the facsimile machine or the like, the document is read continuously and the dark current Id will not decrease to the original state because the application of the voltage to the photodetector element would ordinarily not be stopped for a long period of time while in use.

SUMMARY OF THE INVENTION

Accordingly, it is a general object of the present invention to provide a novel and useful image sensor driving circuit in which the problems described heretofore are eliminated.

Another and more specific object of the present invention is to provide an image sensor driving circuit in which an increase in the dark current with the voltage applying time is suppressed. According to the image sensor driving circuit of the present invention, it is possible to read information with a satisfactory accuracy for a long period of time.

Still another object of the present invention is to provide an image sensor driving circuit for driving an image sensor by applying a voltage thereto comprising voltage supplying means for supplying one of a positive polarity voltage and a negative polarity voltage to the image sensor responsive to a control signal, converting means for converting an output photocurrent of the image sensor into a detection voltage, inverting means for inverting the detection voltage responsive to the control signal, and control means for generating the control signal. The control signal has a predetermined period so that the voltage supplying means alternately supplies the positive polarity voltage and the negative polarity voltage with the predetermined period and the inverting means inverts the detection voltage only during one of first and second halves of each period of the control signal. According to the image sensor driving circuit of the present invention, it is possible to suppress the increase in the dark current with the current applying time. Therefore, it is possible to read information with a satisfactory accuracy for a long period of time.

Other objects and further features of the present invention will be apparent from the following detailed description when read in conjunction with the accompanying drawings.

DETAILED DESCRIPTION

Figure 5:
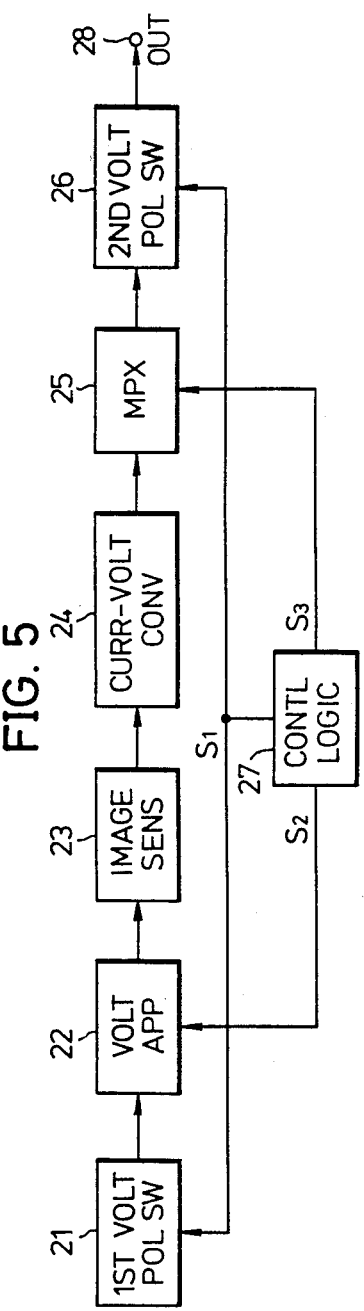
FIG. 5 is a block diagram showing an embodiment of the image sensor driving circuit according to the present invention.

FIG. 5 shows an embodiment of the image sensor driving circuit. The image sensor driving circuit comprises a first voltage polarity switching circuit 21, a voltage applying circuit 22, an image sensor 23 comprising a plurality of photodetector elements, a current-to-voltage converting circuit 24, a multiplexer 25, a second voltage polarity switching circuit 26, and a control logic circuit 27. A voltage from the first voltage polarity switching circuit 21 for reading information from the document (image) is sequentially applied to the photodetector elements of the image sensor 23 from the voltage applying circuit 22 under the control of the control logic circuit 27. The photodetector elements receive a quantity of light dependent on the information optically read from the document, and supply photocurrents to the individual electrodes when applied with the voltage from the voltage applying circuit 22. The current-to-voltage converting circuit 24 converts the photocurrent sequentially outputted from the multiplexer 25 into a detection voltage indicative of the read information.

The control logic circuit 27 also controls the timing with which the first and second voltage polarity switching circuits 21 and 26 switch the polarity of the incoming voltage, so that the polarity of the voltage applied to the image sensor 23 through the voltage applying circuit 22 is inverted with a predetermined period without changing the absolute value thereof and the voltage outputted from the second voltage polarity switching circuit 26 constantly has a fixed polarity. The second voltage polarity switching circuit 26 inverts the output voltage of the multiplexer 25 without changing the absolute value thereof.

When reading the document by the image sensor 23 in a first time period, the control logic circuit 27 controls the first voltage polarity sitching circuit 21 to output a positive polarity voltage, for example, and controls the voltage applying circuit 22 to sequentially apply the positive polarity voltage to the photodetector elements of the image sensor 23. The photocurrents outputted from the photodetector elements when applied with the positive polarity voltage are converted into detection voltages in the current-to-voltage converting circuit 24, and the second voltage polarity switching circuit 26 receives the detection voltage sequentially outputted from the multiplexer 25. In this case, the second voltage polarity switching circuit 26 passes the detection voltage from the multiplexer 25 having a negative polarity as it is under the control of the control logic circuit 27, and a detection voltage OUT is outputted through a terminal 28.

On the other hand, when reading the document by the image sensor 23 in a second time period, the control logic circuit 27 controls the first voltage polarity switching circuit 21 to output a negative polarity voltage, and controls the voltage applying circuit 22 to sequentially apply the negative polarity voltage to the photodetector elements of the image sensor 23. The photocurrents outputted from the photodetector elements when applied with the negative polarity voltage are converted into detection voltages in the current-to-voltage converting circuit 24, and the second voltage polarity switching circuit 26 receives the detection voltage sequentially outputted from the multiplexer 25. In this case, the second voltage polarity switching circuit 26 inverts the polarity of the detection voltage from the multiplexer 25 having a positive polarity under the control of the control logic circuit 27, and the detection voltage OUT having the same polarity as that in the first time period is outputted through the terminal 28.

When not reading information, the control logic circuit 27 controls the voltage applying circuit 22 in a third time period to an inoperative state so that no voltage is applied to the image sensor 23. In other words, the photodetector elements of the image sensor 23 are grounded.

The first, second and third time periods are appropriately repeated when driving the image sensor 23. The lengths of the first and second time periods are set so that a ratio therebetween is in a range of 1:2 to 2:1, and preferably 1:1. The ratio between the lengths of the first and second time periods can be determined by periodically controlling the first and second voltage polarity switching circuits 21 and 26 by the control logic circuit 27.

Figure 3:
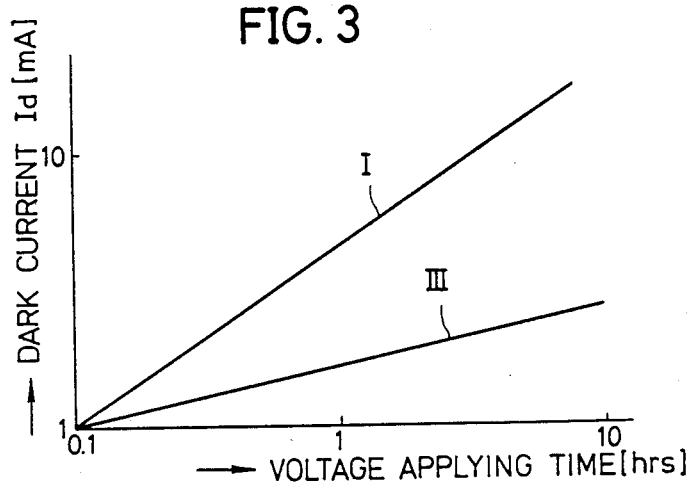
FIG. 3 shows dark current versus voltage applying time characteristics of the conventional image sensor driving circuit and the image sensor driving circuit according to the present invention.
Figure 4:
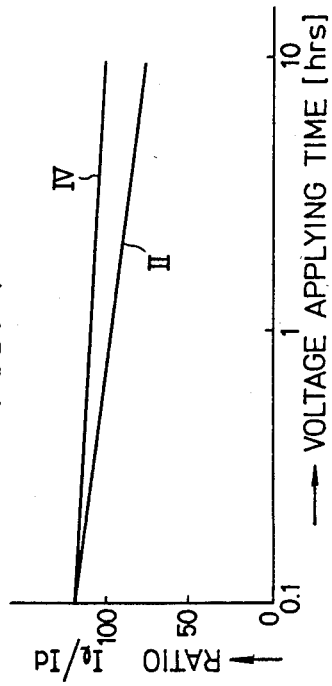
FIG. 4 shows light/dark ratio versus voltage applying time characteristics of the conventional image sensor driving circuit and the image sensor driving circuit according to the present invention.

According to the present embodiment, the polarity of the voltage applied to the image sensor 23 is not fixed, and positive and negative polarity voltages having the same absolute value are alternately applied to the image sensor 23 with a predetermined period. For this reason, compared to the case where a voltage having a fixed polarity is applied to the image sensor, the increase in the dark current Id from the photodetector element with the voltage applying time is considerably reduced. In FIG. 3, a characteristic III shows a voltage applying time versus dark current characteristic obtained in the present embodiment when the ratio between the first and second time periods is 1:1. Due to the small increase in the dark current Id with the voltage applying time, the light/dark ratio Il/Id between a photocurrent from the photodetector element which receives light and the dark current Id from the photodetector element which receives no light only decreases slightly with the voltage applying time as indicated by a characteristic IV in FIG. 4. Hence, in the present embodiment, the light/dark ratio Il/Id which influences the reading accuracy essentially does not deteriorate with the voltage applying time.

Figure 1:
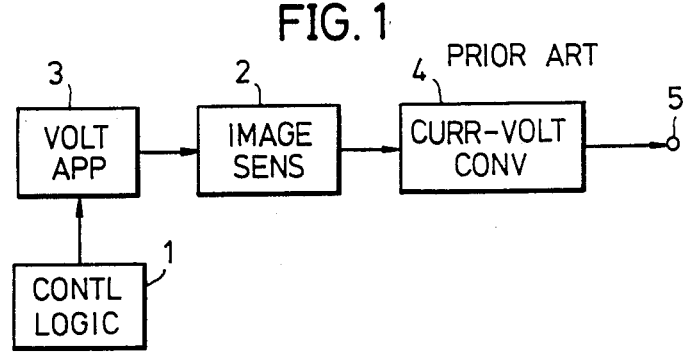
FIG. 1 is a block diagram showing an example of the conventional image sensor driving circuit.
Figure 2:
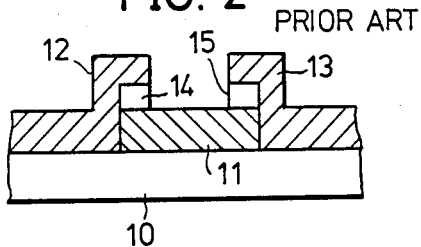
FIG. 2 is a cross sectional view showing a photodetector element of the image sensor.

It is thought that the increase in the dark current Id is extremely small compared to that in the conventional circuit, because both positive and negative charges are induced at the interface between the metal electrode and the highly doped portion or at the interface between the highly doped portion and the semiconductor layer similarly as described before in conjunction with FIG. 2 and the charges of mutually opposite polarities cancel each other.

When the present embodiment is applied to a reading part of a facsimile machine, for example, the first voltage polarity switching circuit 21 may be controlled to switch the polarity of the voltage for every line or for every page of the document. However, it is of course possible to arbitrarily select the period with which the polarity of the applying voltage is switched to other values, such as for every predetermined number of photodetector elements or for every predetermined number of lines of the document.

Next, a description will be given on the more detailed construction of the present embodiment, by referring to FIG. 6. It will be assumed for convenience' sake that the present embodiment is applied to a facsimile machine having m×n photodetector elements arranged in line, where m and n are integers, and the photodetector elements are divided into m photodetector element groups $23_1$ through $23_m$ each having n photodetector elements.

Figure 6:
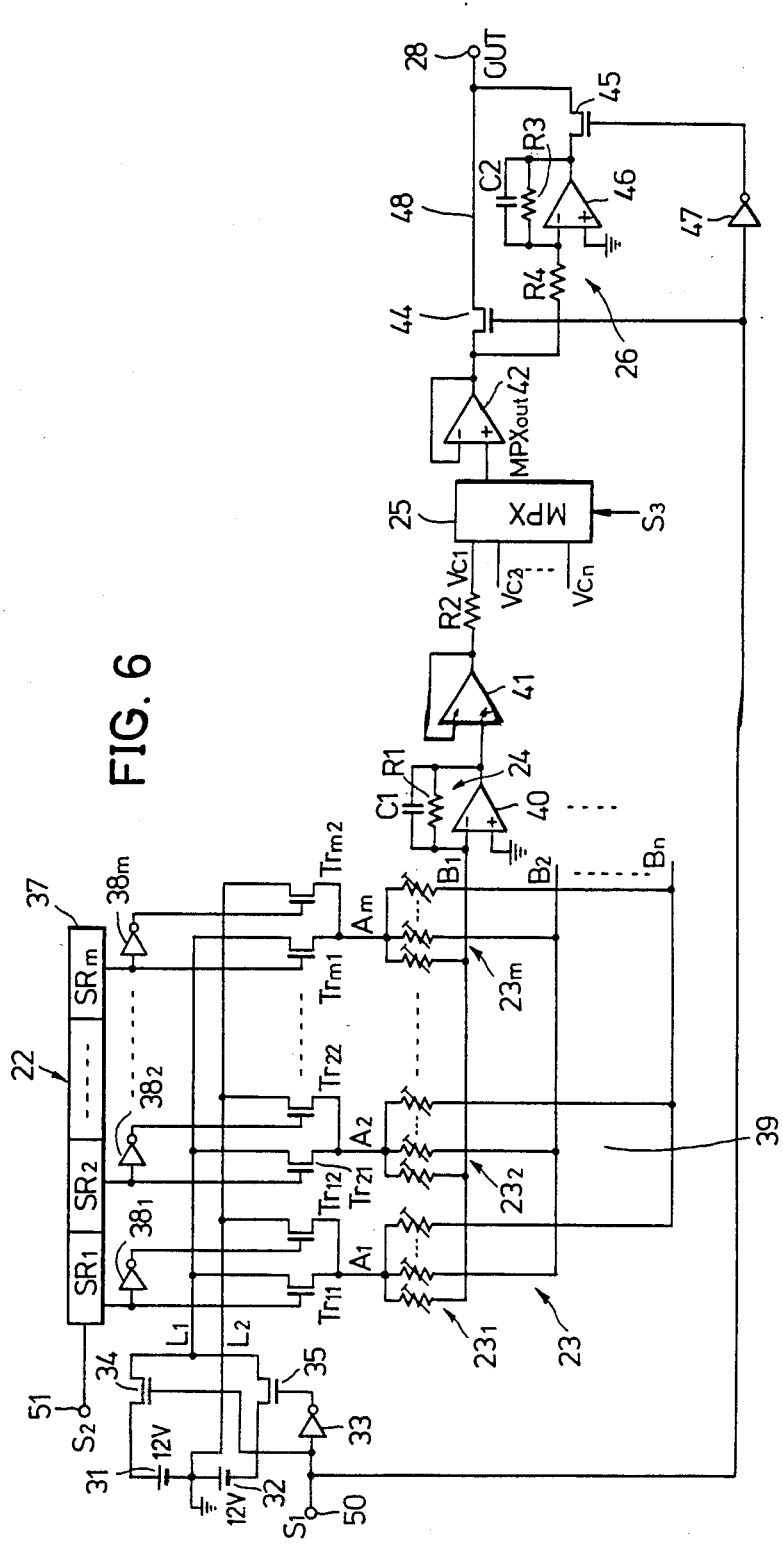
FIG. 6 is a system circuit diagram showing a more detailed construction of the embodiment of the image sensor driving circuit shown in FIG. 5.

In FIG. 6, the first voltage polarity switching circuit 21 comprises voltage sources 31 and 32 respectively for supplying a voltage of 12V, an inverter 33, and transistors 34 and 35. The voltage sources 31 and 32 are connected with opposite polarities thereof to the ground, and a series connection of the voltage source 31 and the transistor 34 is connected in parallel to the series connection of the voltage source 32 and the transistor 35. The ON/OFF states of the transistors 34 and 35 are controlled by a first control signal S1 received from the control logic circuit 27 through a terminal 50. The first control signal S1 controls the period with which the polarity of the voltage applied to the image sensor 23 is switched, and has a period of one line of the document, for example. The inverter 33 is provided between the terminal 50 and the transistor 35, so that the ON/OFF state of the transistor 34 is always opposite to that of the transistor 35.

The voltage applying circuit 22 comprises a shift register 37, inverters $38_1$ through $38_m$, transistors Tr11 through Trm1, and transistors Tr12 through Trm2. A second control signal S2 received from the contol logic circuit 27 is applied to the shift register 37 through a terminal 51. The second control signal S2 controls the sequence in which the voltage from the first voltage polarity switching circuit 21 is applied to the m photodetector element groups $23_1$ through $23_m$. The ON/OFF state of a transistor Tri1 is controlled by an output SRi from a corresponding stage of the shift register 37, and the ON/OFF state of a transistor Tri2 is controlled by an inverted output $\overline{SRi}$ of the corresponding stage of the shift register 37 from the corresponding inverter $38_i$, where i=1, 2, ..., m. Since the transistors Tr11 through Trm1 are connected to a line L1 which connects to the voltage sources 31 and 32 through the respective transistors 34 and 35 while the transistors Tr12 through Trm2 are connected to a line L2 which connected to the ground (that is, the node between the voltage sources 31 and 32), either +12V or −12V is appied to nodes A1 through Am in the sequence controlled by the second control signal S2.

The image sensor 23 is constituted by the m photodetector element groups $23_1$ through $23_m$ each comprising n photodetector elements. First ends of the photodetector elements in the photodetector element groups $23_1$ through $23_m$ are connected to the nodes A1 through Am, respectively. On the other hand, corresponding second ends of the photodetector elements from each of the photodetector element groups $23_1$ through $23_m$ are connected to nodes B1 through Bn in a matrix multilevel interconnection 39.

The current-to-voltage converting circuit 24 comprises an operational amplifier 40, a capacitor C1 and a resistor R1 which are provided for each of the n nodes B1 through Bn, although the connection is only shown for the node B1. A buffer amplifier 41 and a resistor R2 are coupled between the current-to-voltage converting circuit 24 and the multiplexer 25 for each of the n nodes B1 through Bn, in order to cope with the switching speed of the multiplexer 25. The multiplexer 25 is supplied with outputs from the nodes B1 through Bn obtained through the current-to-voltage converting circuit 24 and the corresponding buffer amplifier 41 and resistor R2, but only the connections related to the node B1 is shown for convenience' sake. The multiplexer 25 converts the parallel signals (voltages Vc1 through Vcn) into a serial signal (MPXout) responsive to a third control signal S3 received from the control logic circuit 27.

A buffer amplifier 42 is connected between the multiplexer 25 and the second voltage polarity switching circuit 26, so as to prevent the output level of the multiplexer 25 from decreasing due to a difference in the output impedance of the multiplexer 25 and the impedance of the stage subsequent to the multiplexer 25.

The second voltage polarity switching circuit 26 comprises transistors 44 and 45, an inverting amplifier 46, an inverter 47, a capacitor C2 and resistors R3 and R4. This second voltage polarity switching circuit 26 comprises a pass-line 48 including the transistor 44, and a line which includes the series-connected transistor 45 and the inverting amplifier 46 which inverts the polarity of the incoming voltage. Similarly as in the case of the first voltage polarity switching circuit 21, the ON/OFF states of the transistors 44 and 45 of the second voltage polarity switching circuit 21 are controlled by the first control signal S1, so that the ON/OFF states of the transistors 44 and 45 are always opposite to each other.

Figure 7:
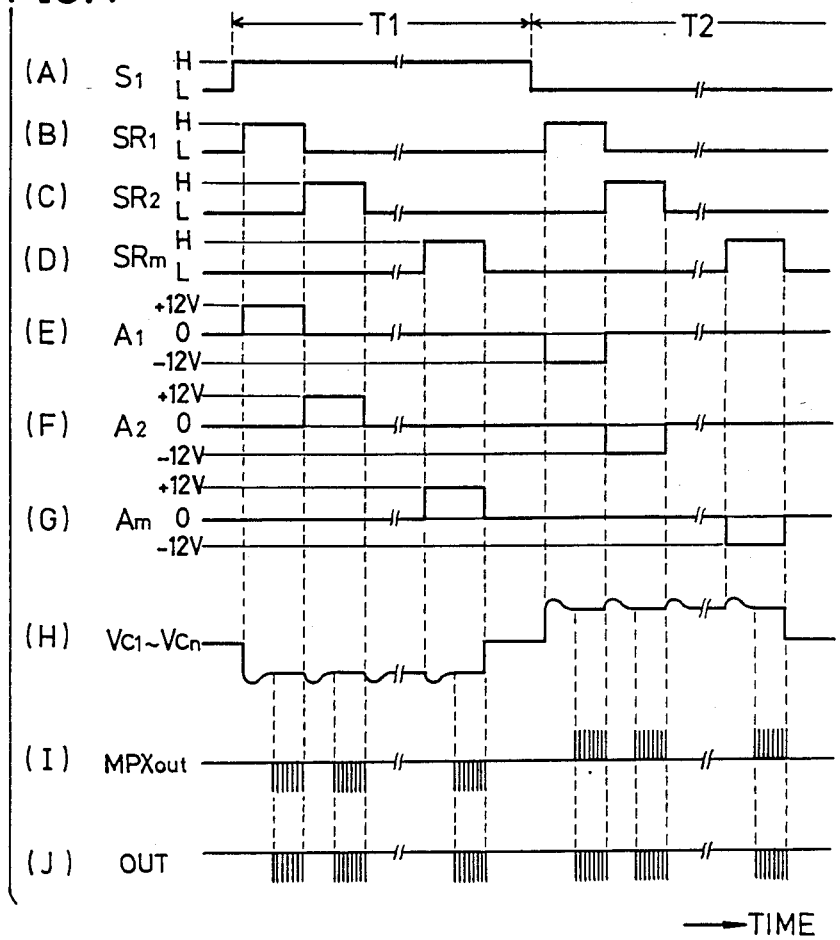
FIGS. 7(A) through 7(J) are time charts for explaining the operation of the image sensor driving circuit shown in FIG. 6.

Next, a description will be given on the operation of the circuit system shown in FIG. 6, by referring to FIGS. 7(A) through 7(J). When reading the first line of the document, the first control signal S1 is set to a high level during a time period T1 corresponding to the first line, as shown in FIG. 7(A). As a result, the transistor 34 is turned ON while the transistor 35 is turned OFF, and the voltage of +12V is supplied to the line L1. The photodetector element group which is to be driven is controlled by the outputs SR1 through SRm of the shift register 37 responsive to the second control signal S2. For example, when the output SR1 has a high level as shown in FIG. 7(B) and the remaining outputs SR2 through SRm have a low level as shown in FIGS. 7(C) and 7(D) for SR2 and SRm, only the transistor Tr11 is turned ON and the remaining transistors Tr21 through Trm1 are turned OFF. On the other hand, only the transistor Tr12 is turned OFF and the remaining transistors Tr22 through Trm2 are turned ON in this case. Accordingly, the node A1 becomes coupled to the line L1 and is applied with the voltage of +12V as shown in FIG. 7(E). The remaining nodes A2 through Am become coupled to the line L2 and are thus grounded as shown in FIGS. 7(F) and 7(G) for A2 and Am. As a result, only the n photodetector elements of the photodetector element group $23_1$ are applied with the voltage of +12V and driven.

Photocurrents dependent on the quantity of light received flow from the photodetector elements of the photodetector element group $23_1$ and are applied to respective nodes B1 through Bn. The photocurrents are converted into detection voltages in the current-to-voltage converting circuit 24, and are supplied to the multiplexer 25 through the corresponding buffer amplifier 41 and resistor R2 as the voltages Vc1 through Vcn shown in FIG. 7(H). The multiplexer 25 sequentially outputs the voltages Vc1 through Vcn, and an output voltage MPXout shown in FIG. 7(I) of the multiplexer 25 is supplied to the second voltage polarity switching circuit 26 through the buffer amplifier 42.

In this case, during the time period T1, the transistor 44 is turned ON and the transistor 45 is turned OFF in the second voltage polarity switching circuit 26 responsive to the first control signal S1. Hence, the pass-line 48 is selected, and the output voltage OUT of the buffer amplifier 42 is outputted as it is through the terminal 28 as shown in FIG. 7(J).

The operation described heretofore is similarly carried out by selectively driving the remaining photodetector element groups $23_2$ through $23_m$ in sequence.

Thereafter, when reading the second line of the document, the first control signal S1 is set to a low level during a time period T2 corresponding to the second line, as shown in FIG. 7(A). As a result, the transistor 34 is turned OFF while the transistor 35 is turned ON, and the voltage of −12V is supplied to the line L1. The photodetector element group which is to be driven is controlled by the outputs SR1 through SRm of the shift register 37 responsive to the second control signal S2. For example, when the output SR1 has a high level as shown in FIG. 7(B) and the remaining outputs SR2 through SRm have a low level as shown in FIGS. 7(C) and 7(D) for SR2 and SRm, only the transistor Tr11 is turned ON and the remaining transistors Tr21 through Trm1 are turned OFF. On the other hand, only the transistor Tr12 is turned OFF and the remaining transistors Tr22 through Trm2 are turned ON in this case. Accordingly, the node A1 becomes coupled to the line L1 and is applied with the voltage of −12V as shown in FIG. 7(E). The remaining nodes A2 through Am become coupled to the line L2 and are thus grounded as shown in FIGS. 7(F) and 7(G) for A2 and Am. As a result, only the n photodetector elements of the photodetector element group $23_1$ are applied with the voltage of −12V and driven.

Photocurrents dependent on the quantity of light received flow from the photodetector elements of the photodetector element group $23_1$ and are applied to respective nodes B1 through Bn. The photocurrents are converted into detection voltages in the current-to-voltage converting circuit 24, and are supplied to the multiplexer 25 through the corresponding buffer amplifier 41 and resistor R2 as voltages Vc1 through Vcn shown in FIG. 7(H). The multiplexer 25 sequentially outputs the voltages Vc1 through Vcn, and an output voltage MPXout shown in FIG. 7(I) of the multiplexer 25 is supplied to the second voltage polarity switching circuit 26 through the buffer amplifier 42.

In this case, during the time period T2, the transistor 44 is turned OFF and the transistor 45 is turned ON in the second voltage polarity switching circuit 26 responsive to the first control signal S1. Hence, the line including the series-connected transistor 45 and inverting amplifier 46 is selected, and the output voltage of the buffer amplifier 42 is inverted before being outputted through the terminal 28 as shown in FIG. 7(J).

As may be seen from FIG. 7(J), the polarity of the voltage OUT outputted through the terminal 28 is the same regardless of the polarity of the voltage applied to the image sensor 23.

The operation described heretofore is similarly carried out by selectively driving the remaining photodetector element groups $23_2$ through $23_m$ in sequence.

Therefore, in the present embodiment, the photodetector element groups $23_1$ through $23_m$ are sequentially applied with the voltage of +12V when reading odd lines and are sequentially applied with the voltage of −12V when reading even lines of the document.

Further, the present invention is not limited to these embodiments, but various variations and modifications may be made without departing from the scope of the present invention.

What is claimed is:

1. An image sensor driving circuit for driving an image sensor by applying a voltage thereto, said image sensor driving circuit comprising:
    voltage supplying means for supplying one of a positive polarity voltage and a negative polarity voltage to said image sensor responsive to a control signal;
    converting means for converting an output photocurrent of said image sensor into a detection voltage;
    inverting means for inverting the detection voltage responsive to the control signal; and
    control means for generating the control signal, said control signal having a predetermined period so that said voltage supplying means alternately supplies the positive polarity voltage and the negative polarity voltage with the predetermined period and said inverting means inverts the detection voltage only during one of first and second halves of each period of the control signal.

2. An image sensor driving circuit as claimed in claim 1 in which said image sensor comprises a plurality of photodetector elements, said voltage supplying means comprising a first voltage polarity switching circuit for alternately supplying the positive polarity voltage and the negative polarity voltage responsive to the control signal and a voltage applying circuit for applying the voltage from said first voltage polarity switching circuit to the photodetector elements of said image sensor in sequence responsive to another control signal, said other control signal being generated from said control means.

3. An image sensor driving circuit as claimed in claim 1 in which said image sensor comprises a plurality of photodetector elements, said photodetector elements being divided into a plurality of photodetector element groups each comprising a predetermined number of photodetector elements, said voltage supplying means supplying the output voltage thereof to said photodetector element groups in sequence responsive to the control signal thereby driving each of the photodetector elements within the photodetector element group at one time.

4. An image sensor driving circuit as claimed in claim 3 in which said predetermined period of the control signal is set so that all of said photodetector element groups are driven within one-half period of the control signal.

5. An image sensor driving circuit as claimed in claim 1 in which said predetermined period of the control signal is equal to a time it takes to scan one line of a document by said image sensor.

6. An image sensor driving circuit as claimed in claim 5 in which said predetermined period of the control signal is equal to a time it takes to scan one page of a document by said image sensor.

* * * * *